Nov. 22, 1927. 1,650,532
T. R. MUIR
POTATO SORTING TABLE
Filed Nov. 23, 1926  3 Sheets-Sheet 3
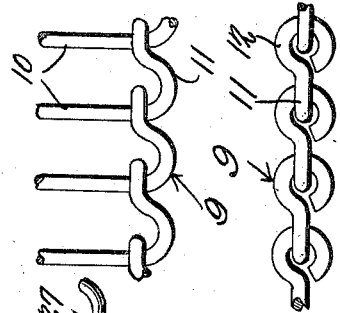
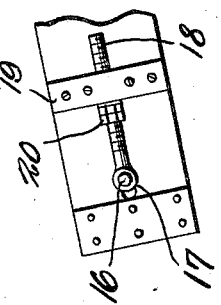
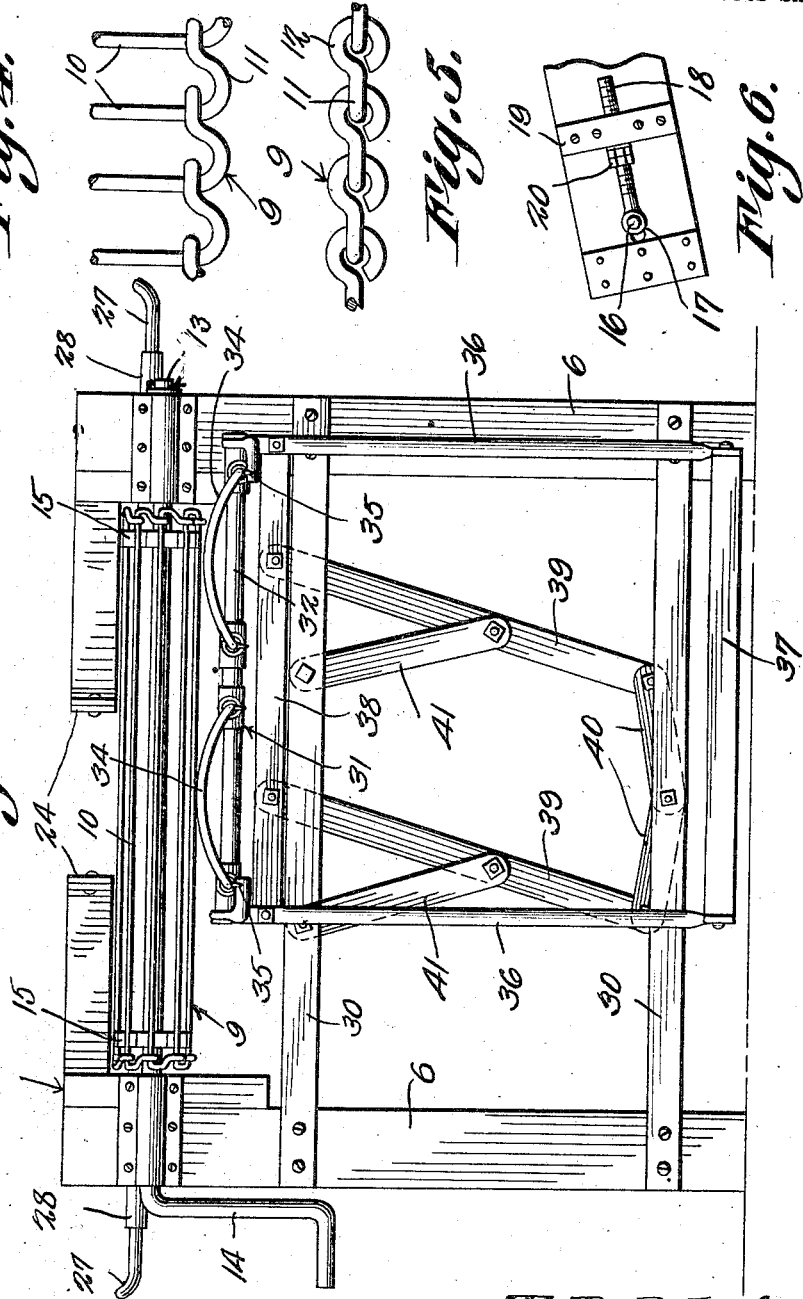
T. R. Muir
Inventor,
By C. A. Snow & Co.
Attorneys.

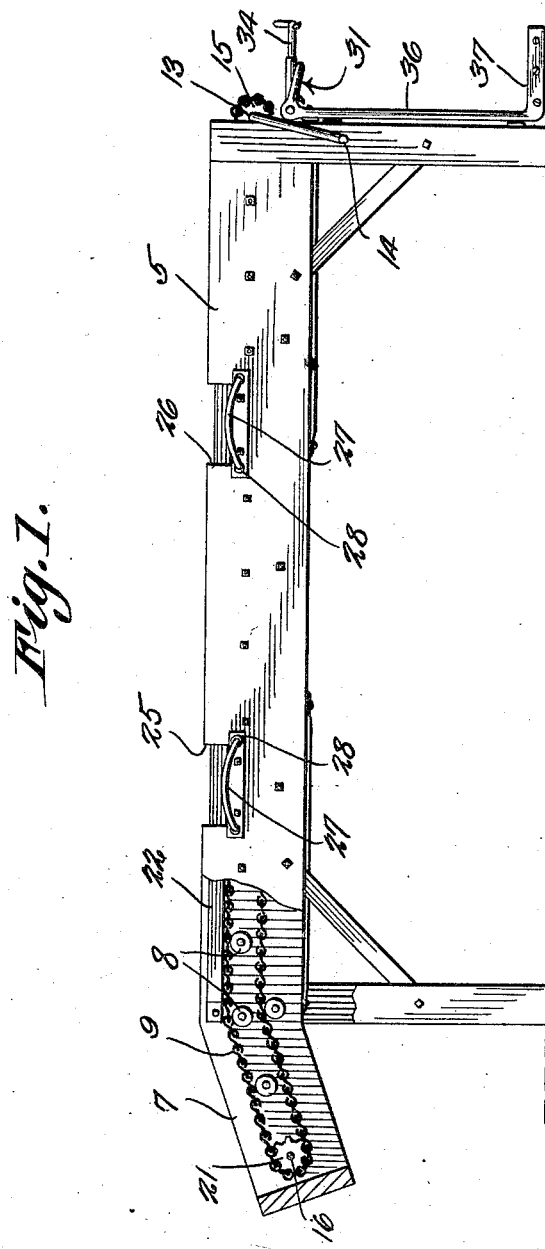

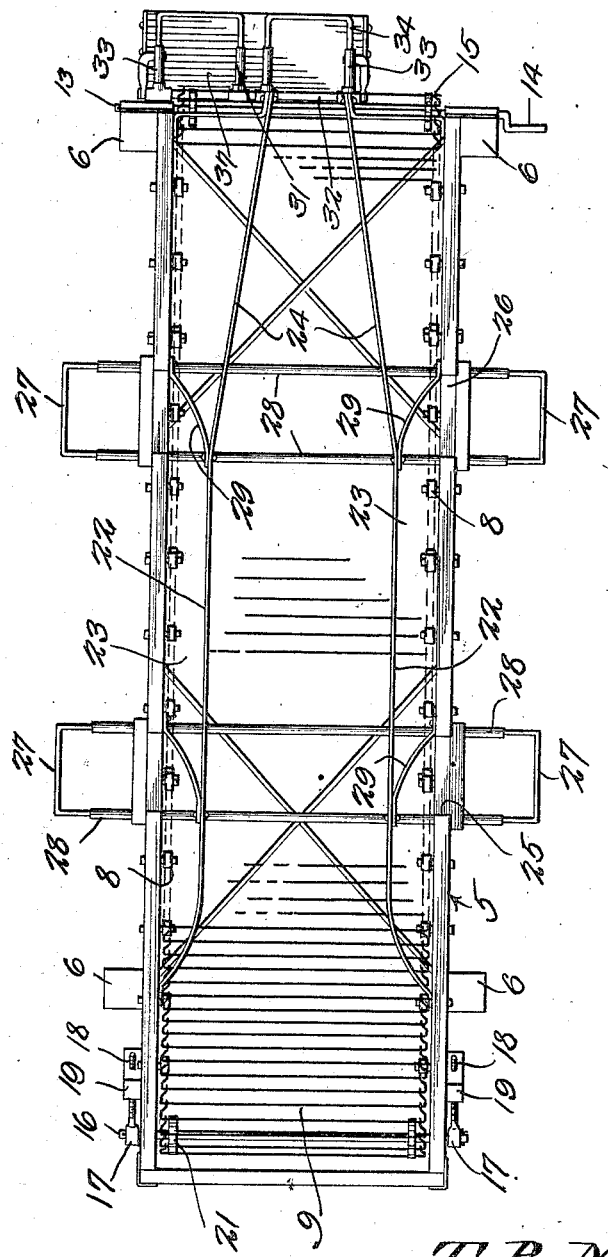

Patented Nov. 22, 1927.

1,650,532

UNITED STATES PATENT OFFICE.

THOMAS R. MUIR, OF SUNNYSIDE, WASHINGTON.

POTATO-SORTING TABLE.

Application filed November 23, 1926. Serial No. 150,261.

The present invention relates to a machine especially designed for grading and sacking vegetables and fruits, the primary object of the invention being to provide a device of this character wherein the grading and sacking may be accomplished simultaneously, and with facility.

Another object of the invention is to provide a machine including an endless conveyor on which the vegetables or fruit to be graded are positioned, the endless conveyor acting to carry the vegetables or fruit towards the discharge end of the machine where they are delivered into sacks.

A still further object of the invention is to provide lateral partitioning members above the conveyor, the latter partitioning members providing passageways for delivering the articles being graded, laterally of the machine, novel means being provided at the ends of the passageways for supporting sacks to receive the articles.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a grading machine constructed in accordance with the invention.

Figure 2 is a plan view of the machine.

Figure 3 is an end elevational view of the machine.

Figure 4 is a fragmental view illustrating the conveyor construction.

Figure 5 is a side elevational view of the conveyor.

Figure 6 is a fragmental view illustrating the means for adjusting the conveyor.

Referring to the drawings in detail, the device includes a frame embodying a table 5 supported by means of the legs 6.

The table embodies side boards which have their forward ends extended downwardly as at 7 so that the vegetables or fruit may be readily and easily positioned on the endless conveyor to be hereinafter more fully described.

Supported by the side boards of the frame are rollers 8 disposed in spaced relation with each other, said rollers being designed to support the endless conveyor 9 which endless conveyor is constructed of a plurality of rods 10 having substantially right angled ends 11 formed with eyes 12, the eyes of one rod accommodating the adjacent rod to connect the adjacent rods.

At one end of the frame is a shaft 13 which is provided with a crank handle 14 at one end thereof, whereby the shaft may be rotated. Mounted on the shaft 13 are sprockets 15 over which the endless conveyor operates, the same being shown as engaging the sprockets.

At the opposite end of the machine is a shaft 16 mounted in the bearings 17 provided with threaded shanks 18 which threaded shanks operate through enlarged openings in the blocks 19 so that the shanks may move freely therethrough, there being provided adjusting nuts 20 on the shanks for moving the shaft 16 to adjust the tension of the endless conveyor operating thereover.

Sprockets 21 are formed on the shaft 16 and over which the endless conveyor moves. Secured to the inner surfaces of the side boards of the frame are bars 22, the same being held in spaced relation with the side boards to provide passageways 23 which bars have converging ends 24 defining a spout to direct the articles to the discharge end of the machine.

As shown, more clearly by Figure 2 of the drawings, the side boards are cut away providing discharge openings 25 and 26 respectively on opposite sides of the machine, which discharge openings allow articles to pass laterally from the machine into sacks supported by the adjustable sack holders 27 which are in the form of substantially U-shaped members having their ends movable in the pipes 28 that in turn have their ends extended beyond the side boards of the machine, the pipes being arranged in spaced relation with each other.

In order that the articles may be directed to the discharge openings, curved members 29 are provided adjacent to the discharge openings, the curved members having connection with the bars 22 and with the inner surfaces of the side boards of the machine.

Thus it will be seen that as the endless conveyor is moving through the machine, articles will be carried to the discharge openings.

The legs 6 at the discharge end of the machine are connected by means of the end bars 30, which bars support the adjustable sack carrier forming an important feature of the invention.

The sack carrier is indicated by the reference character 31 and includes a main pipe 32 and lateral pipes 33 in which the substantially U-shaped members 34 are adjustably held, there being provided prongs 35 for piercing the sack which is held thereby to prevent the sack from slipping from the sack holders.

Connected with the pipe 32 are vertical members 36 disposed at the ends of the pipe 32, the lower ends of the members 36 being connected with the platform 37.

The sack carrier also embodies a bar 38 disposed adjacent to the upper end thereof to which, bars 39 are pivotally connected, the bars 39 being also pivotally connected with the bars 40 at the lower ends thereof, the bars 40 having pivotal connection with the lower bar 30 as clearly shown by Figure 2.

Connecting the bars 39 and the bar 30 are substantially short arms 41, which arms 41 and bars 40 permit of swinging movement of the sack carrier transversely of the machine, to the end that one of the sack holders supported at the upper end of the sack carrier may be brought to a position opposite the discharge spout of the machine.

Thus it will be seen that due to this construction a sack may be held in position to receive material from the discharge spout by merely swinging the sack carrier in one direction. While a sack is being filled, it is obvious that an empty sack may be positioned on the adjacent sack holder so that when the sack adjacent to the discharge spout becomes filled, the sack carrier may be swung to bring the empty sack opposite to the discharge opening, while the filled sack is being removed.

In the operation of the machine, the vegetables or fruit are positioned on the forward end of the machine and the crank handle 14 is operated to cause the endless conveyor to move through the machine. It is obvious that as the endless conveyor moves through the machine, the vegetables or fruit will be carried through the machine and persons standing adjacent to the table may pick the vegetables or fruit from the endless conveyor according to the sizes, depositing them in the lateral passageways where they may be carried into the sacks supported adjacent thereto.

As the conveyor continues, the fruit or vegetables which have not been picked from the central portion of the machine will of course pass to the discharge end of the machine where they will fall into the sacks supported at the discharge end.

I claim:

1. In combination with the horizontal spaced end bars of a supporting structure, a frame including an upper bar and side bars, connecting bars having pivotal connection with the upper bar of the frame, bars pivotally connected with the lower bar of the supporting structure and having pivotal connection with the connecting bars, bars connected with the connecting bars and having pivotal connection with one of the horizontal spaced bars of the supporting structure, and a platform at the base of the frame for supporting articles.

2. In combination with the horizontal spaced end bars of a supporting structure, a laterally swinging frame including an upper bar, a lower bar and side bars, bars connected with the upper bar of the frame, substantially short bars pivotally connected with the last mentioned bars and having pivotal connection with one of the horizontal spaced end bars of the supporting structure, and bars pivotally connected with one of the horizontal bars and having pivotal connection with the first mentioned pivoted bars, and a platform forming a part of the frame.

In testimony that I claim the foregoing as my own, I have hereto affixed my signature.

THOMAS R. MUIR.